(12) United States Patent
Lasater

(10) Patent No.: US 6,221,513 B1
(45) Date of Patent: *Apr. 24, 2001

(54) METHODS FOR HERMETICALLY SEALING CERAMIC TO METALLIC SURFACES AND ASSEMBLIES INCORPORATING SUCH SEALS

(75) Inventor: Brian J. Lasater, East Wenatchee, WA (US)

(73) Assignee: Pacific Coast Technologies, Inc., Wenatchee, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,230

(22) Filed: May 12, 1998

(51) Int. Cl.$^7$ .................................................... C03C 27/04
(52) U.S. Cl. ......................... 428/629; 428/632; 428/660; 428/680; 428/472; 428/702
(58) Field of Search ..................... 428/627, 632, 428/633, 660, 680, 469, 472, 699, 701, 702, 629; 420/917; 228/122.1, 124.6, 56.3, 262.72

(56) References Cited

U.S. PATENT DOCUMENTS

| | | |
|---|---|---|
| 3,091,028 | 5/1963 | Westbrook et al. ................. 29/473.1 |
| 3,174,851 * | 3/1965 | Buehler ................................... 75/170 |
| 3,309,767 | 3/1967 | Sama et al. ............................ 29/494 |
| 3,594,895 | 7/1971 | Hill ..................................... 29/473.1 |
| 3,662,455 | 5/1972 | Anderson . |
| 3,840,408 * | 10/1974 | Bondley .............................. 136/133 |
| 3,897,223 | 7/1975 | Purdy et al. ........................... 29/195 |
| 4,690,480 | 9/1987 | Snow et al. ........................... 439/364 |
| 4,704,338 * | 11/1987 | Landingham et al. ............... 428/627 |
| 4,725,509 * | 2/1988 | Ryan .................................... 428/607 |
| 4,883,640 * | 11/1989 | Mizuhara ............................. 420/417 |
| 4,957,236 | 9/1990 | Mizuhara ............................. 228/263 |
| 4,991,582 | 2/1991 | Byers et al. ...................... 128/419 P |
| 5,013,612 * | 5/1991 | Hunt et al. ........................... 428/552 |

(List continued on next page.)

FOREIGN PATENT DOCUMENTS

| | | |
|---|---|---|
| 4187573 | 7/1992 | (JP) . |
| 8067575 | 3/1996 | (JP) . |
| 8-67575 * | 3/1996 | (JP) . |

OTHER PUBLICATIONS

"Semi Alloys: High Purity Precsion Alloys: Semialloy Brazing Alloys". Technical Bulletin BA–65, 20 N. MacQuest-Parkway, Mount Vernon, NY, Jul. 22, 1968.*

R.N. Correia, J.V. Emiliano et al., "Microstructure of diffusional zirconia–titanium and zirconia–(Ti–6 wt% Al–4 wt% V) alloy joints,"*Journal of Materials Science*, vol. 33, pp. 215–221 (1998) (no month).

*Primary Examiner*—Deborah Jones
*Assistant Examiner*—Stephen Stein
(74) *Attorney, Agent, or Firm*—Ann W. Speckman; Janet Sleath; James E. Klaniecki (57) ABSTRACT

Methods for hermetically sealing an interface surface of ceramic materials, such as zirconia, to an interface surface of metallic materials, such as titanium alloys, using a titanium-nickel alloy filler material are disclosed. Preferred ceramic materials include stabilized zirconia materials; preferred metallic materials include titanium-niobium alloys; and a preferred titanium-nickel filler material is a 50-50 titanium-nickel alloy. At least one of the interfaces is contacted by the titanium-nickel alloy filler material and sealing is accomplished under vacuum conditions at temperatures of from 900 to 1200° C. during application of pressure to the joint. The methods are especially suitable for use in hermetically sealing ceramic and metallic components for applications such as implantable medical devices, electrical connectors, electronic packages, sporting goods, structural components, and the like.

14 Claims, 4 Drawing Sheets

U.S. PATENT DOCUMENTS

| | | | |
|---|---|---|---|
| 5,041,019 | 8/1991 | Sharp et al. | 439/559 |
| 5,109,594 | 5/1992 | Sharp et al. | 29/600 |
| 5,110,307 | 5/1992 | Rapoza | 439/566 |
| 5,298,683 | 3/1994 | Taylor | 174/152 |
| 5,334,344 | 8/1994 | Hegner et al. | 420/422 |
| 5,433,260 | 7/1995 | Taylor | 164/97 |
| 5,675,122 | 10/1997 | Taylor | 174/50.58 |
| 5,702,837 | 12/1997 | Xue | 429/40 |

* cited by examiner

METHODS FOR HERMETICALLY SEALING CERAMIC TO METALLIC SURFACES AND ASSEMBLIES INCORPORATING SUCH SEALS

FIELD OF THE INVENTION

The present invention relates to methods for hermetically sealing ceramic materials, such as zirconia, to metallic materials, such as titanium alloys, using a titanium-nickel alloy filler material. The methods are especially suitable for use in hermetically sealing ceramic and metallic components for applications such as implantable medical devices, electrical connectors, electronics packages, structural components, and the like.

BACKGROUND OF THE INVENTION

The development of advanced materials has accelerated in recent years. Materials of various types have properties that are desirable for a wide range of applications in diverse environments. Although the materials are highly advanced, it is often difficult to adapt them for use in applications in which they must interface with materials having different properties. Sealing of dissimilar materials at interface surfaces between the materials, for example, has frequently been problematic.

Many applications require materials to be sealed hermetically. Providing reliable hermetic seals at the interface surfaces of materials having different properties, particularly different coefficients of thermal expansion, has been difficult. U.S. Pat. Nos. 5,298,683, 5,433,260, 5,675,122, 5,110,307, 5,041,019, 5,109,594 and 4,690,480 disclose various methods for hermetically sealing different types of materials, particularly materials having different thermal properties, to one another. Many of these patents relate to hermetically sealing various materials for use in electrical connectors and electronics packages using a transition joint or bushing.

U.S. Pat. No. 4,991,582 discloses a sealed ceramic and metal package for electronic devices implantable in living bodies. This patent describes a device in which a ceramic sleeve is sealed to a metallic band having substantially the same coefficient of linear thermal expansion. The sleeve is formed of an inert ceramic material such as alumina or boron nitride, and the metal band is formed of niobium, molybdenum or tantalum. A header plate carrying a substrate on which the electronic components are mounted and having a plurality of electrical connectors is then sealed to the metal band. The ceramic sleeve is sealed to the metal band employing a butt brazing technique using an alloy of 71.5% titanium and 28.5% nickel. Brazing is accomplished by heating the ceramic sleeve, fitted with the metal band and an annular foil of brazing material. The electronic components that are ultimately mounted in the ceramic sleeve cannot tolerate the high temperatures required during the brazing operation, and are inserted into the cavity formed by the ceramic sleeve when the header is joined to the metallic band. The metal to metal seal between the header and the metal band is provided using high temperature welding, such as laser or electron beam welding, having a low heat-affected zone that does not affect the integrity of the electronic components.

U.S. Pat. No. 3,594,895 discloses 50-50 brazing alloys of titanium with iron, cobalt, nickel or mixtures thereof for sealing ceramic to metallic materials, such as tantalum, niobium and group VIII metals. The 50-50 titanium-niobium brazing alloy had a melting point of 1250° C., requiring heating to temperatures just above 1250° C. for brazing. The brazing process, including the heating, melting and cooling process, took about five minutes.

Zirconia ceramic materials and, particularly, stabilized zirconia ceramic materials, are preferred ceramic materials for many applications. Zirconia ceramics are generally stronger and less reactive in harsh environments than alumina ceramics, making them suitable candidates for applications such as implantable devices. The relative expense of zirconia ceramics and the difficulty of providing reliable hermetic seals at the interface of zirconia ceramics with metallic materials have presented challenges in using zirconia ceramics in many applications. Providing a reliable hermetic seal of zirconia ceramic materials to metallic materials, and particularly titanium-containing metallic materials, has been particularly difficult as a result of the active nature of titanium metals. The methods of the present invention are directed to providing reliable, hermetic seals at the interface of ceramic materials, particularly zirconia ceramic materials, with metallic materials, particularly titanium-containing metallic materials.

SUMMARY OF THE INVENTION

The present invention provides methods for hermetically sealing ceramic materials, such as zirconia materials, to metallic materials, particularly titanium-containing and copper-containing metallic materials, using a titanium-nickel sealing alloy. Broadly, the methods of the present invention may be adapted to seal a variety of ceramic and ceramic-like materials, including materials comprising zirconia and stabilized zirconia, alumina, silicon nitride, silicon carbide, titanium carbide, tungsten carbide, titanium nitride, silicon-aluminum oxy-nitride (sialon), graphite, titanium di-boride, boron carbide, zirconia toughened alumina, and molybdenum disilicide. These materials and materials having similar properties are collectively referred to as "ceramic" materials in this specification and the appended claims. Zirconia ceramic materials stabilized with yttria, magnesia, ceria, calcia or combinations thereof, are especially preferred ceramic materials.

Metallic materials to which the ceramic materials may be joined include various titanium-containing, copper-containing and tantalum-containing alloys, such as titanium-niobium alloys and titanium-tantalum alloys, and refractory materials such as molybdenum and zirconium alloys. Titanium-containing and copper-containing metallic alloy materials are preferred, with titanium-niobium and titanium-tantalum alloys being especially preferred. Titanium-niobium alloys preferably comprise at least about 45% titanium and at least about 35% niobium. A titanium-niobium alloy composed of 55% titanium and 45% niobium is especially preferred.

Sealing alloys comprising titanium and nickel are preferred for use in hermetically sealing ceramic interface surfaces to metallic interface surfaces according to methods of the present invention. Titanium-nickel alloys comprising at least 35% nickel and at least 35% titanium are preferred; alloys comprising at least about 45% nickel and at least about 45% titanium are more preferred; and sealing alloys having a 50% titanium and 50% nickel composition are especially preferred.

Interface surfaces of ceramic and metallic components having various conformations and configurations may be hermetically sealed to one another using sealing alloys and methods of the present invention. Surfaces to be sealed are cleaned to remove any foreign or oxidized materials and are arranged adjacent and in proximity to one another, with sealing alloy contacting at least one of the interface surfaces in the vicinity of the intended hermetic seal. The sealing alloy is preferably in physical contact with the metallic interface surface. The sealing alloy may be provided as a thin foil member, as a paste comprising metallic powders, as metallic powders or beads, or as a preformed insert (a "preform") having the approximate configuration of the surfaces being sealed and fitting generally between the interface surfaces being sealed. Annular washers comprising sealing alloy material may be used, for example, to seal annular or cylindrical interface surfaces.

After the sealing alloy is positioned adjacent the interface surfaces to be sealed, the assembly comprising the interface surfaces and sealing alloy is heated under vacuum conditions to the desired sealing temperature for the desired length of time. Sealing temperatures of less than about 1150° C., generally from about 900° C. to 1150° C. are preferred, with sealing temperatures less than about 1100° C., and preferably from about 1000° C. to 1100° C. being especially preferred. The sealing alloys of the present invention are preferably capable of forming a liquidus at a temperature below about 1150° C. The sealing alloy wets the interface surfaces during the sealing operation, and obviates the need to metalize the ceramic interface surface prior to sealing. Following the formation of a liquidus, the assembly is cooled and a solid, hermetic seal is formed between the interface surfaces. Temperatures may be ramped up to the desired sealing temperature over a predetermined time period and ramped down over a predetermined time period during cooling according to various sealing protocols. According to preferred methods, pressure is applied to the interface surfaces during the sealing process.

Sealing methods and materials of the present invention may be used to provide hermetic seals on the exterior or interior of an assembly. Multiple components may be sealed simultaneously. Thus, for example, one or more ceramic to metal assemblies having sealing alloy contacting at least one of the components in the vicinity of the desired seal may be mounted inside a ceramic and metal exterior assembly which, itself, has sealing alloy contacting at least one of the components in the vicinity of the desired seal. The full assembly may be heated to sealing temperatures in a vacuum furnace to produce the desired interior and exterior hermetic seals simultaneously.

According to preferred embodiments of the present invention, the materials, including the ceramic material, the metallic material, and the sealing alloy are selected to optimize the sealing operation and the hermetic joint formed thereby. In one aspect, this optimization involves the use of a sealing alloy that, in the presence of the metallic surface being sealed, has a melting point lower than it otherwise would. The preferred sealing alloy for use in methods of the present invention, for example, a 50-50 titanium-nickel alloy, has a melting point of approximately 1250° C. to 1275° C. In the presence of a preferred 55-45 titanium-niobium metallic material and a stabilized zirconia ceramic material, the effective melting point of the 50-50 titanium-nickel sealing alloy is reduced to less than 1150° C., generally to between about 1000° C. and 1100° C. Thus, a sealing alloy that may be unsuitable for use with stabilized zirconia ceramic materials as a result of its high melting point, may be used to seal such materials in the presence of selected metallic materials. Under these conditions, the metallic material contributes to the wetting of the ceramic, but does not excessively react and is not degraded during the sealing process.

Methods for sealing ceramic and metallic components of the present invention may be employed for numerous applications. The applications described below include implantable medical devices and electrical connectors. The sealing techniques may be used for many different types of implantable medical devices, artificial joints and structural components, various types of electrical connectors and electronics packages for use in various environments, cutting tool components and inserts, fuel cells, gas sensors, pulp and paper handling equipment, pump components, seawater components, as well as other structural applications, such as golf clubs and other types of sporting goods.

DESCRIPTION OF THE FIGURES

Preferred embodiments of the present invention will be described with reference to the figures, in which.

DESCRIPTION OF THE PREFERRED EMBODIMENTS

Methods of the present invention are described below with reference to certain preferred embodiments of component assemblies, such as implantable medical devices and electrical connectors. The methods of the present invention are not limited for use in such applications or in connection with component assemblies having similar configurations or properties. Broadly, the methods of the present invention may be used to provide a hermetic seal at the interface surfaces of ceramic components having a variety of geometries and metallic components having a variety of geometries, with the sealed components being used for a variety of applications in diverse environments.

Ceramic and ceramic-like materials, such as zirconia, are suitable for use with sealing techniques of the present invention. Ceramic materials comprising zirconia are preferred, and stabilized zirconia materials are especially preferred. Partially stabilized zirconia (PSZ), tetragonal zirconia (TTZ), and zirconia ceramics stabilized with yttria, magnesia, ceria or calcia, or a combination of stabilizing materials, are especially preferred. Suitable materials are available commercially and may be provided in a variety of configurations using, for example, injection molding techniques.

Ceramic materials may be hermetically sealed to various metallic materials using the sealing methods of the present invention. In particular, the sealing methods of the present invention are particularly suitable for sealing zirconia ceramic materials to titanium-containing and copper-containing metallic alloys and refractory metallic materials such as molybdenum-, zirconium-, tantalum- and niobium-containing metallic materials. Titanium-niobium and titanium-tantalum are preferred, with titanium-niobium metallic materials comprising at least 45% titanium and 35% niobium being more preferred, and 55-45 titanium-niobium metallic alloys being especially preferred. Copper-containing metallic alloys such as chromium-copper, beryllium-copper, and dispersion strengthened copper are also preferred for certain applications, particularly for applications involving electrical connectors.

Sealing alloys of the present invention preferably comprise titanium-nickel alloys comprising at least about 40% titanium and at least about 40% nickel, and most preferably comprise a 50-50 titanium-nickel alloy. The preferred 50-50 titanium-nickel sealing alloy is available, for example, from WESCO of Belmont, Calif. The sealing alloy may be provided in the form of a thin foil having a thickness of about 0.0001 inch to about 0.010 inch, with a thickness of about 0.001 to about 0.006 inch being preferred, and a thickness of about 0.003 to about 0.004 inch being especially preferred. The sealing alloy foil may be arranged at the interface between a ceramic surface and a metallic surface in the vicinity of a desired hermetic seal. Alternatively, the sealing alloy may be provided as a "preform" having the approximate configuration of the desired seal area. Sealing alloy preforms in the configuration of washers may be used, for example, to seal annular and cylindrical components. Annular washers having a 50-50 titanium-nickel composition are especially preferred for use in sealing techniques of the present invention. The sealing alloy may also be provided in the form of metallic beads or powders, or in a paste form in which finely divided powders are combined with a compatible solvent and binder. Suitable solvents and binders are well known in the art.

The inventor has discovered that certain combinations of materials interact to provide highly desirable sealing conditions. Specifically, the combination of a 50-50 titanium-nickel sealing alloy to seal the interface surfaces of a stabilized zirconia ceramic component to a metallic component composed of a titanium-niobium metallic alloy and, more specifically, a 55-45 titanium-nickel alloy, is especially preferred. Using these materials, the melting point of the titanium-nickel sealing alloy is effectively lowered so that the sealing operation may be accomplished at temperatures of less than about 1150° C., and generally at temperatures between about 1000° C. and 1100° C. These temperatures are well tolerated by the preferred zirconia ceramic materials. Under these conditions, the seal formed by the sealing alloy between the ceramic and metallic interface surfaces is reliably hermetic, durable and strong. Additionally, the seal area has a unique structure and composition, as described in detail below.

Sealing techniques of the present invention will be described below with reference to specific component assemblies. It will be recognized that the sealing techniques described with reference to the specific components are exemplary only, and that the methods of the present invention may be adapted to provide hermetic seals at the interface of many different types and configurations of ceramic and metallic components.

Figure 1A:
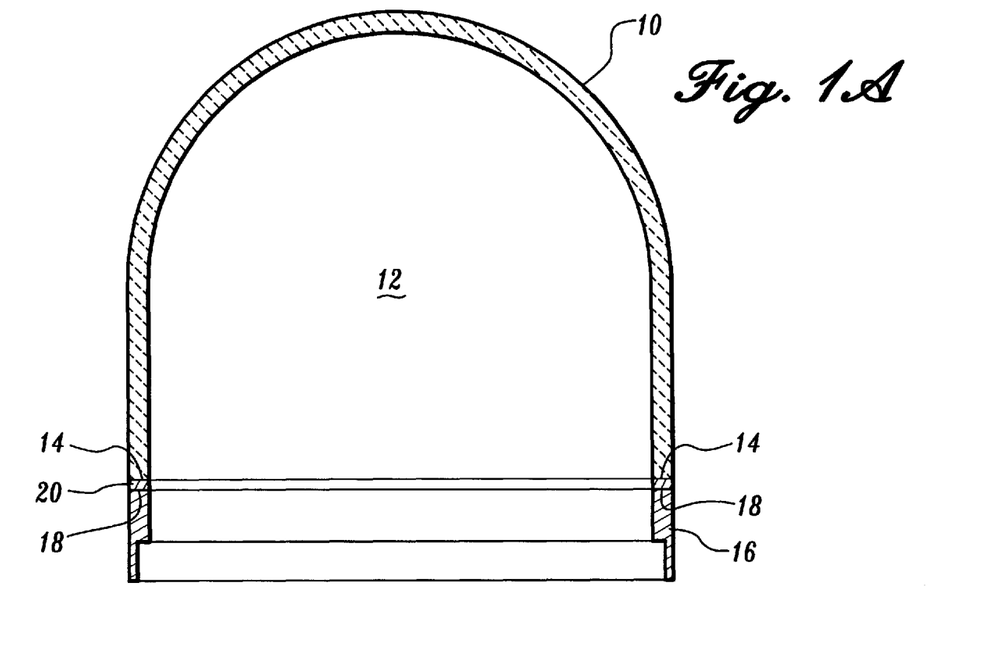
FIGS. 1A and 1B illustrate schematic cross-sectional top and side views, respectively, of a component assembly comprising a ceramic sleeve component, a sealing alloy preform and a metallic band component aligned prior to heating to form the hermetic ceramic to metal seal.
Figure 1B:
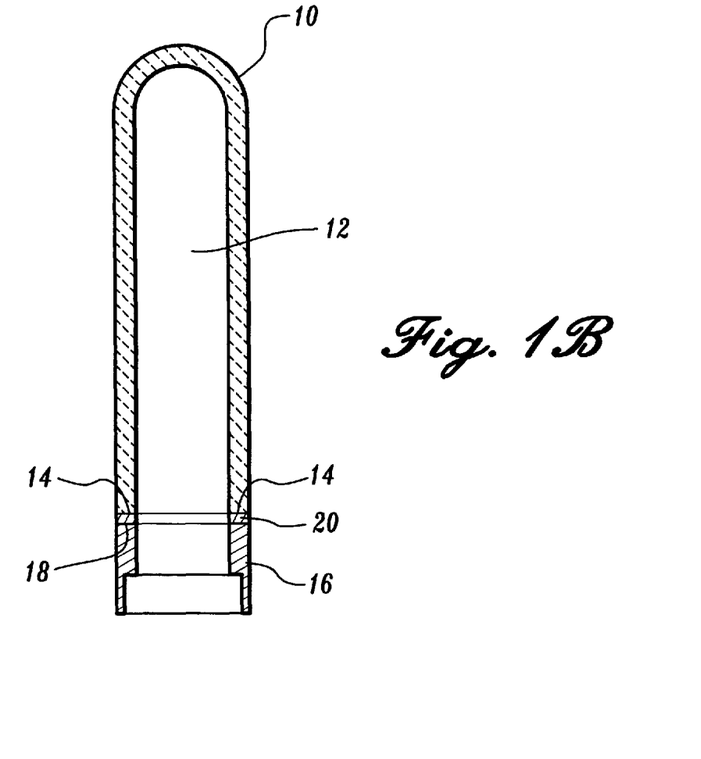

FIGS. 1A and 1B illustrate cross-sectional schematic top and side views of a ceramic sleeve, a sealing alloy preform in the configuration of a washer, and a metallic band component aligned prior to heating to form the hermetic ceramic to metal seal. As shown in FIGS. 1A and 1B, ceramic sleeve 10 is in the configuration of a flattened, disk-like sleeve forming an internal cavity 12. Ceramic sleeve 10 has a continuous interface surface 14 for hermetically sealing to metallic band 16. Metallic band 16 has a continuous interface surface 18 that is substantially the same configuration and dimension as interface surface 14 of ceramic sleeve 10. In the embodiment illustrated in FIGS. 1A and 1B, interface surfaces 14 and 18 are substantially smooth and flat, and the joint formed between them is referred to as a "butt" joint. It will be recognized that different configurations of interface surfaces may be provided and different types of joints may be sealed using the methods of the present invention.

Metallic band 16 is positioned so that its interface surface 18 is adjacent to interface surface 14 of ceramic sleeve 10. Sealing alloy preform 20 is provided in the form of a washer positioned between the ceramic and metallic interface surfaces 14 and 18, respectively. In the preferred embodiment illustrated in of FIGS. 1A and 1B, sealing alloy preform 20 contacts both ceramic and metallic interface surfaces 14 and 18. According to preferred embodiments, ceramic sleeve 10 is composed of stabilized zirconia ceramic material; metallic band 16 is composed of a titanium-niobium alloy and, preferably, a titanium-niobium alloy comprising at least 35% niobium and at least 45% titanium; and sealing alloy preform 20 is composed of a titanium-nickel alloy and, preferably, a 50-50 titanium-nickel alloy preform in the configuration of a washer having a thickness of about 0.003 to about 0.004 inch.

The assembly shown in FIG. 1 is heated under vacuum conditions to a sealing temperature of below about 1150° C., preferably to a sealing temperature between about 1000° C. and about 1100° C. The desired sealing temperature and times will vary depending upon the composition of the sealing alloy, the configuration and dimensions of the interface surfaces, and the composition of the ceramic and metallic materials being hermetically sealed. For sealing alloys comprising at least 40% titanium and at least 40% nickel in combination with metallic materials comprising at least 35% niobium and at least 45% titanium, the preferred sealing temperature is between about 1000° C. and 1100° C., and the sealing time is from several minutes to several hours. The assembly is cooled following heating. The heating and cooling process is preferably accomplished by gradually increasing the temperature from ambient to the desired sealing temperature, and then by gradually reducing the temperature from the desired sealing temperature back to ambient temperatures. The sealing protocol will vary, depending upon the composition of the sealing alloy, the configuration and dimensions of the interface surfaces, and the composition of the materials being sealed.

According to preferred sealing methods using the 50-50 titanium-nickel sealing alloy, the assembly is heated under vacuum conditions from ambient temperature to the desired sealing temperature by increasing the temperature at a predetermined rate until the desired sealing temperature is reached. The assembly is preferably maintained at the sealing temperature for a time period of from about one minute to one hour, preferably about two minutes to about 30 minutes. The assembly is then gradually cooled from the desired sealing temperature to ambient temperature by reducing the temperature at a predetermined rate.

Figure 2:
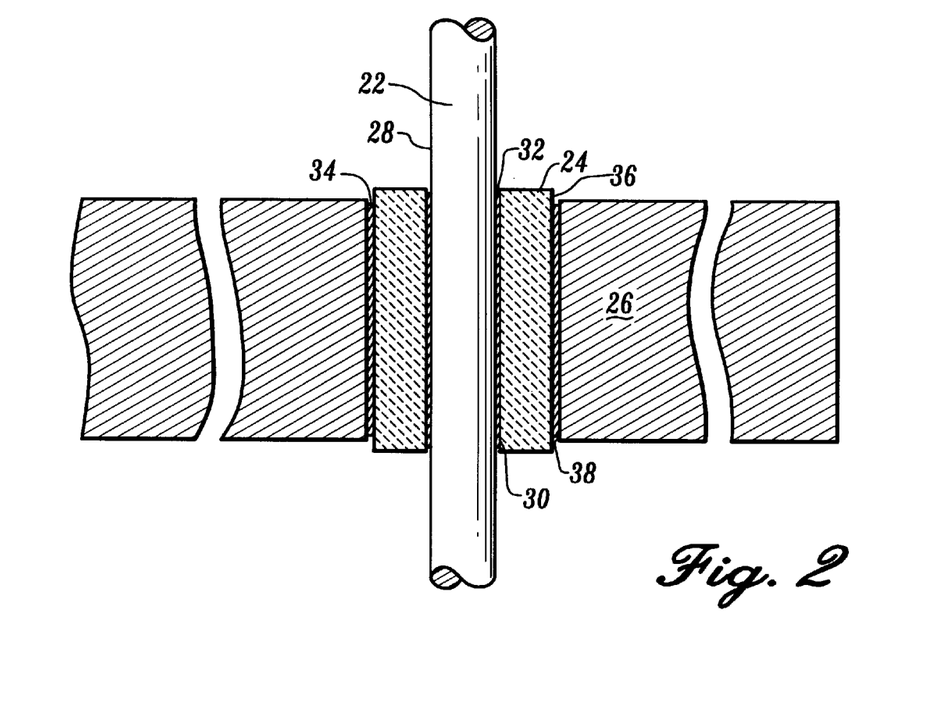
FIG. 2 illustrates a schematic cross-sectional side view of a hermetically sealed component assembly comprising a metallic pin sealed to a ceramic ferrule which is sealed in a metallic wall, with the ceramic and metallic interface surfaces sealed using a titanium-nickel filler alloy according to methods of the present invention.

Additional configurations of components and assemblies illustrating the sealing techniques and materials of the present invention are illustrated in FIGS. 2–6. The sealing materials and techniques described above may be employed with these components and assemblies. FIG. 2 illustrates an assembly in which a metallic pin is sealed to an insulating ferrule 24 which, in turn, is sealed in a metallic wall or plate 26. A titanium-nickel sealing alloy comprising at least 40% titanium and 40% nickel and, preferably, a 50-50 titanium-nickel alloy sealing material is employed for each seal. Metallic pin 22 preferably comprises a titanium-containing or copper-containing metallic material, and most preferably comprises a titanium-niobium alloy comprising at least 45% titanium and 35% niobium. Metallic wall or plate 26 similarly preferably comprises a titanium-containing metallic material, most preferably a titanium-niobium alloy. Insulating ferrule 24 preferably comprises a ceramic material such as zirconia.

For the assembly illustrated in FIG. 2, a sealing layer 32 of metallic foil or paste comprising the sealing alloy constituents is positioned between the cylindrical interface surface 28 of metallic pin 22 and the inner cylindrical interface surface 30 of ceramic ferrule 24. Similarly, a sealing layer 34 of metallic foil or paste comprising the sealing alloy constituents is positioned between outer interface surface 36 of ceramic ferrule 24 and interface surface 38 of metallic wall or plate 26. Sealing layer 34 may be co-extensive with the interface surfaces, or may be provided along a portion of the interface surfaces, with the sealing alloy wetting and sealing the length of the interface surface during the sealing process. Hermetic sealing of the metallic pin to the ceramic ferrule and the ceramic ferrule to the metallic wall or plate may be accomplished serially or simultaneously.

Using the techniques and components described above, metallic pins may be mounted and hermetically sealed in an insulating ferrule which is, in turn, hermetically sealed in a metallic wall or plate. This type of assembly may be used for a variety of applications, including electronics packaging and various types of sensors.

Figure 3:
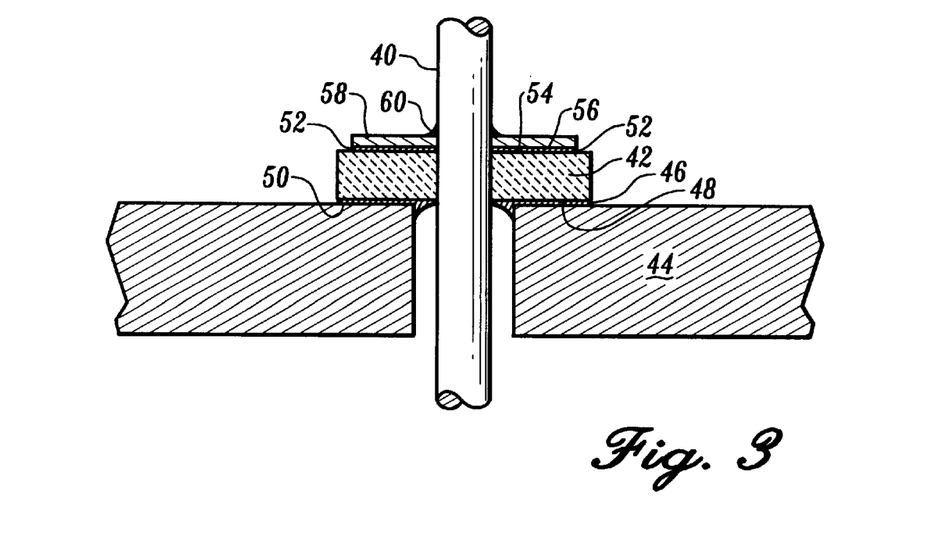
FIG. 3 illustrates a schematic cross-sectional side view of a component assembly in which a conductive metallic pin is welded to a metallic disk, which is hermetically sealed to a ceramic washer, with the surface of the ceramic washer sealed to a metallic surface, the ceramic to metallic interface surfaces being sealed according to methods of the present invention.

FIG. 3 illustrates an alternative embodiment of a metallic pin mounted in a metallic plate or wall by means of a ceramic element. In this embodiment, metallic pin 40 is mounted in an insulating block 42, which is hermetically sealed to a metallic wall or plate 44 and a metallic plate 58. A titanium-nickel sealing alloy comprising at least 40% titanium and 40% nickel, and preferably, a 50-50 titanium-nickel alloy sealing material is provided between the appropriate ceramic and metallic interface surfaces for each seal. Metallic pin 40 preferably comprises a titanium-containing or copper-containing metallic material, and most preferably comprises a titanium-niobium alloy comprising at least 45% titanium and 35% niobium. Metallic wall or plate 26 similarly preferably comprises a titanium-containing or copper-containing metallic material, most preferably a titanium-niobium alloy. Insulating block 42 preferably comprises a ceramic material such as zirconia.

For the assembly illustrated in FIG. 3, a sealing layer 46 of metallic foil or paste, or a sealing preform, comprising the sealing alloy constituents, is positioned between the lower interface surface 48 of insulating block 42 and the interface surface 50 of metallic plate or wall 44. Similarly, a sealing layer 52 of metallic foil or paste, or a preform comprising the sealing alloy constituents, is positioned between upper interface surface 54 of insulating block 42 and a lower interface surface 56 of metallic plate 58. Hermetic sealing of insulating block 42 to metallic wall or plate 44 and metallic plate 58 may be accomplished serially or simultaneously. Metallic pin 40 is hermetically sealed to insulating block 42 by contact with sealing layer 46. Additionally, metallic pin 40 may be hermetically sealed to metallic plate 58 by means of a fusion weld 60, such as electron beam welding or laser welding.

Figure 4:
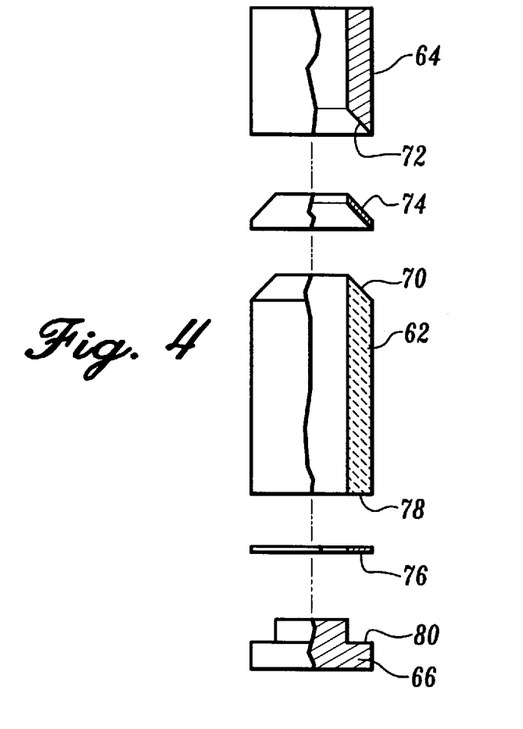
FIG. 4 illustrates a schematic side view of a component assembly in which a metallic end cap and a metallic sleeve are sealed to opposite interface surfaces of a ceramic component according to sealing methods of the present invention.

FIG. 4 illustrates yet another application for the sealing materials and methods of the present invention. Annular ceramic element 62 is sealed to metallic sleeve 64 and metallic end cap 66 using the sealing techniques and materials of the present invention. According to a preferred embodiment, a sealing alloy foil or preform 74 comprising titanium and nickel constituents is positioned between oblique ceramic interface surface 70 and corresponding oblique metallic interface surface 72. The conformation and dimensions of sealing alloy foil or preform 74 preferably substantially match the conformation and dimensions of the corresponding interface surfaces. Similarly, sealing alloy foil or preform 76 comprises titanium and nickel constituents and is positioned between ceramic interface surface 78 and metallic interface surface 80. The assembly is heated under vacuum conditions to the desired sealing temperature and cooled to hermetically seal ceramic element 62 to the metallic end cap and sleeve simultaneously.

Figure 5:
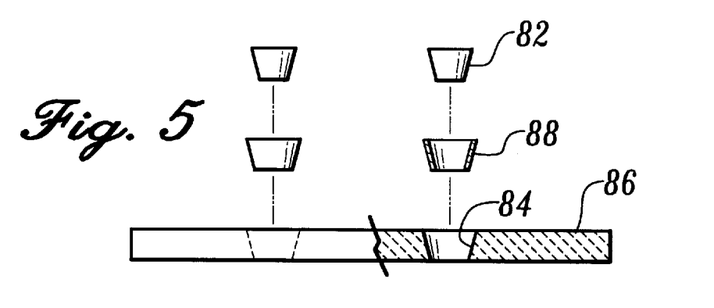
FIG. 5 illustrates a schematic side view of metallic pins sealed in conical apertures in a ceramic plate.
Figure 6:
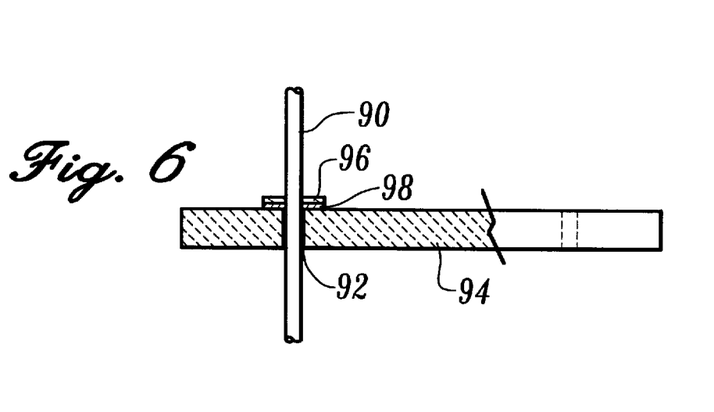
FIG. 6 illustrates a schematic side view of another component assembly in which a metallic pin is hermetically sealed in an aperture in a ceramic plate.

FIG. 5 illustrates yet another configuration of ceramic and metallic members and interface surfaces that are hermetically sealed using the techniques and materials of the present invention. In the embodiment of FIG. 5, frustoconical metallic pin or plug 82 is hermetically sealed in a recess 84 in ceramic plate 86 having a corresponding configuration and dimension using sealing alloy preform 88. FIG. 6 illustrates a component assembly in which metallic pin 90 is mounted through metallic washer 96 and recess 92 in ceramic plate 94. Sealing alloy preform 98 comprising titanium and nickel metals is placed between the interface surfaces of metallic washer 96 and ceramic plate 94, and the assembly is heated under vacuum conditions to sealing temperatures. During the sealing process, the sealing alloy forms a liquidus which wets and seals the interface surfaces between metallic washer 96 and ceramic plate 94. The sealing alloy also wets the interface surfaces between metallic pin 90 and recess 92 of ceramic plate 94 and forms a hermetic seal at those interface surfaces as well. The dimensions and volume of sealing alloy preform 98 may be adjusted to provide sealing alloy sufficient to wet and seal the desired interface surfaces during heating and cooling. This component configuration may be used, for example, in connection with electronics packages and implantable medical devices.

Sealing methods of the present invention preferably involve the application of pressure to one or more of the interface surfaces in the direction of the joint during heating and cooling. Thus, for example, pressure may be exerted on the ceramic sleeve and/or the metallic band illustrated in FIGS. 1A and 1B during heating to press or squeeze interface surfaces 14 and 18 toward one another. Application of pressures on the order of from about 2,000 to 5,000 psi, preferably about 3,500 to 4,500 psi, and most preferably about 4,000 psi is suitable. For sealing applications such as those illustrated in FIGS. 4–6, application of pressure to the "top" of the assembly during sealing, such as by use of a weight, is preferred. Ramping of the application of pressure so that the pressure increases as the temperature increases and the pressure is of the desired maximum when the sealing temperature is attained may be desirable for some sealing applications.

The sealing process of the present invention, when employed in connection with preferred sealing alloys comprising at least 40% titanium and at least 40% nickel and preferred metallic materials comprising titanium and niobium, effectively lowers the melting point of the sealing alloy. A preferred 50-50 Titanium-nickel alloy has a melting point of about 1250° C. to about 1275° C. Using the materials and methods of the present invention, the preferred 50-50 titanium-nickel sealing alloy forms a liquidus at temperatures less than about 1150° C., and preferably between about 1000° C. and 1100° C. The desired lower of the temperature at which the sealing alloy forms a liquidus occurs in the presence of a metallic material comprising titanium and niobium.

Figure 7A:
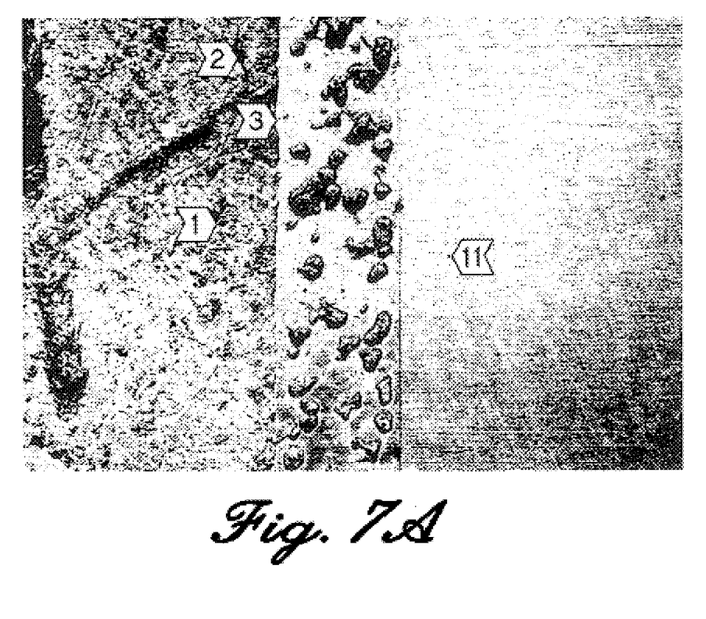
FIGS. 7A and 7B illustrate scanning electron micrographs of a cross-section of a metal (55-45 titanium-niobium) to ceramic (yttria-stabilized zirconia) joint sealed according to methods of the present invention using a 50-50 titanium-nickel sealing alloy, with FIG. 7A showing a 296× magnification, and FIG. 7B showing a 999× magnification.
Figure 7B:
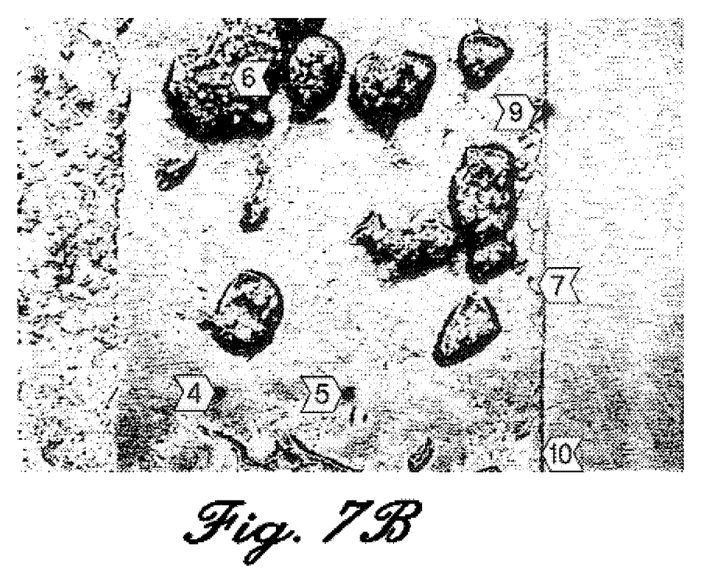

FIGS. 7A and 7B illustrate 296× and 999× scanning electron micrographs, respectively, of a cross section of a joint sealed according to methods of the present invention. Zone A is a titanium-niobium metallic component comprising a 55-45 titanium-niobium alloy; zone B is the interface area and incorporates the sealing alloy composing a 50-50 titanium-nickel; and zone C is a yttria-stabilized zirconia material. The titanium-niobium metallic component was sealed to the zirconia component using the sealing alloy using the methods described above.

Elemental compositions of various regions indicated at flags 1–7 and 9–11 of the joint and surrounding material were determined using energy dispersive x-ray analysis. The results were as follows:

| Flag | Elemental Composition |
|---|---|
| 1 | Preponderance of titanium and niobium in proportion to the bulk 55–45 composition of the metallic material with a small amount of nickel. |
| 2 | Preponderance of titanium and niobium, with a smaller niobium peak than at flag 1, and a larger amount of nickel than at flag 1. |
| 3 | Preponderance of titanium, with a sizeable nickel peak and a small niobium peak. |
| 4 | Preponderance of titanium, with a sizeable nickel peak and a small niobium peak - very similar to the composition at flag 3. |
| 5 | Preponderance of titanium, with a sizeable nickel peak and a small niobium peak - very similar to the composition at flags 3 and 4. |
| 6 | Preponderance of titanium and niobium in nearly equal amounts and a very small amount of nickel. |
| 7 | Preponderance of titanium, with a substantial niobium peak, a less substantial nickel peak, and a small zirconium peak. |
| 9 | Preponderance of titanium with small nickel, niobium and zirconium peaks. |
| 10 | Preponderance of titanium with small niobium and nickel peaks and a larger zirconium peak. |
| 11 | Preponderance of zirconium with a small yttria peak and very small titanium eaks. |

The analytical results demonstrate that, during the sealing process, there is significant migration of elements between the metallic material and the sealing alloy. Significant amounts of nickel were identified at flags 1–3, in the titanium-niobium metallic material, and at the interface between the titanium-niobium metallic material and titanium-nickel sealing, alloy. Nickel from the sealing material thus migrates into the metallic material. The interface area designated generally as zone B, which incorporates the sealing alloy layer, has a large number of dispersed granular structures. The analysis of interface zone B at flags 4 and 5, which do not incorporate a granular structure, indicates the presence of titanium and nickel, with a small amount of niobium. The analysis at flag 6, which is within a granular structure in interface zone B, indicates a preponderance of niobium and titanium, with only a small amount of nickel. The interface zone of the joint, in the area of the sealing alloy, is thus characterized by granular structures having a high niobium content. Niobium from the metallic material migrates into the sealing alloy in the interface zone and forms high niobium content granules during the sealing process.

A hermetically sealed assembly of the present invention may include a metallic material comprising titanium and niobium, an interface zone in the area of a sealing alloy comprising a titanium alloy, and a ceramic material. The assembly of the present invention is characterized by the presence of granular structures in the interface zone, as shown, for example, in scanning electron micrographs of a cross section of the joint area. The granular structures have a composition different from that of the sealing alloy. Specifically, when the metallic material of the assembly comprises titanium and niobium, granular structures present in the interface zone have a high niobium content and, generally, the granular structures present in the interface zone largely comprise niobium and titanium. According to preferred embodiments, using energy dispersive x-ray analysis, granular structures present in the interface zone demonstrate a niobium peak that is at least 50% as large as the titanium peak and, in especially preferred embodiments, the titanium and niobium peaks are generally equivalent. Assemblies incorporating ceramic to metal seals made according to the sealing methodology of the present invention may be identified based on the presence of high niobium content granules in the interface zone.

While the sealing methods, compositions, and sealed assemblies of the present invention have been described with respect to certain preferred embodiments thereof and many details have been set forth for purposes of describing the invention in detail, it will be recognized that additional configurations, embodiments and materials may be used without departing from the invention.

I claim:

1. A component assembly composed of a metallic component comprising a titanium-containing alloy, the metallic component in contact with a metallic filler material comprising a titanium-nickel material, the filler material additionally in contact with a ceramic component comprising zirconia, whereby the titanium-nickel material is capable of forming a liquidus at a temperature of less than 1100° C. in the presence of the metallic component and the ceramic component.

2. A component assembly according to claim 1, wherein the metallic filler material comprises at least about 35% nickel.

3. A component assembly according to claim 2, wherein the metallic filler material comprises a 50-50 titanium-nickel alloy material.

4. A component assembly of claim 1, wherein the ceramic material comprises a material selected from the group consisting of: stabilized zirconia; partially stabilized zirconia; tetragonal zirconia; yttria-stabilized zirconia; magnesia-stabilized zirconia; ceria-stabilized zirconia; and calcia-stabilized zirconia.

5. A component assembly of claim 1, wherein the titanium-nickel metallic filler material is in the form of metallic beads.

6. A component assembly of claim 1, wherein the titanium-nickel metallic filler material is in the form of metallic powder.

7. A component assembly of claim 1, wherein the titanium-nickel metallic filler material is in the form of a paste in which finely divided metallic powders are combined with a compatible solvent and binder.

8. A component assembly of claim 1, wherein the titanium-nickel metallic filler material is in the form of a metallic preform having a thickness of about 0.001 to about 0.006 inch.

9. A component assembly comprising a titanium-containing metallic component and a ceramic component, wherein an interface surface of the metallic component is hermetically sealed to an adjacent interface surface of the ceramic component by means of an intermediate layer of a metallic material comprising at least about 35% nickel and having a melting point, in the presence of the interface surfaces of the metallic component and the ceramic component, of less than 1100° C.

10. A component assembly according to claim 9, wherein the ceramic component comprises a material selected from the group consisting of: zirconia; alumina; silicon nitride; silicon carbide; titanium carbide; tungsten carbide; titanium-nitride; silicon aluminum oxy-nitride; graphite; titanium di-boride; boron carbide; and molybdenum disilicide.

11. A component assembly according to claim 9, wherein the intermediate layer of metallic material comprises a 50-50 titanium-nickel material.

12. A component assembly according to claim 9, wherein the ceramic component comprises zirconia.

13. An assembly comprising a metallic component composed of a titanium-containing alloy and a ceramic material, wherein an interface surface of the metallic component is hermetically sealed to an adjacent interface surface of the ceramic component, the assembly having an interface zone comprising a metallic filler material comprising titanium and nickel, wherein the metallic component comprises nickel in its interface zone, and wherein the metallic filler material has a melting point of less than 1100° C. in the presence of the interface surfaces of the metallic component and the ceramic component.

14. An assembly according to claim 13, wherein the ceramic component comprises a zirconia ceramic.

* * * * *